United States Patent [19]

Hrusch et al.

[11] Patent Number: 4,787,486
[45] Date of Patent: Nov. 29, 1988

[54] LANDING GEAR MECHANISM INCLUDING CONTROLLED INSTROKE AND REBOUND DAMPING AND STROKE OVERLOAD PROTECTION

[75] Inventors: Louis C. Hrusch, Chesterland; Richard J. Winn, Parma, both of Ohio

[73] Assignee: Pneumo Abex Corporation, Boston, Mass.

[21] Appl. No.: 876,101

[22] Filed: Jun. 19, 1986

[51] Int. Cl.[4] .............................................. F16F 9/48
[52] U.S. Cl. ............................ 188/289; 244/104 FP; 267/64.22
[58] Field of Search ............... 188/289, 284, 286, 287; 267/64.18, 64.22; 244/104 FP

[56] References Cited

U.S. PATENT DOCUMENTS

| 522,508 | 7/1894 | Canet | 188/289 X |
|---|---|---|---|
| 2,332,520 | 10/1943 | Lucht | 188/289 X |
| 2,497,972 | 2/1950 | Beecher | 188/316 |
| 3,003,595 | 10/1961 | Patriquin | 188/289 X |
| 3,006,628 | 10/1965 | Utting | 188/287 X |
| 3,215,283 | 11/1965 | Shaver | 188/289 X |
| 3,367,453 | 2/1968 | Arendarski | 188/289 |
| 3,713,546 | 1/1973 | Daugherty, Jr. | 267/64.22 X |
| 4,004,662 | 1/1977 | Sorgatz et al. | 188/284 |
| 4,405,119 | 9/1983 | Masclef et al. | 188/289 X |
| 4,423,800 | 1/1984 | Kobiske et al. | 188/316 X |
| 4,552,324 | 11/1985 | Hrusch | 188/285 |
| 4,595,159 | 6/1986 | Hrusch | 244/104 FP |

FOREIGN PATENT DOCUMENTS

| 518063 | 11/1955 | Canada | 188/289 |
|---|---|---|---|
| 720302 | 6/1942 | Fed. Rep. of Germany | 188/287 |
| 357045 | 2/1938 | Italy | 188/289 |

Primary Examiner—George E. A. Halvosa
Attorney, Agent, or Firm—Renner, Otto, Boisselle & Sklar

[57] ABSTRACT

Landing gear mechanism includes a variable area orifice to obtain the desired rebound damping of the landing gear mechanism during landing, and one or more check valve assemblies that operate in conjunction with the variable area orifice to provide the desired controlled instroke of the landing gear mechanism during landing. Also, the landing gear mechanism is provided with a relief valve assembly that permits bypass flow at a pre-set pressure drop only during an intermediate portion of the instroke of the landing gear mechanism to attenuate severe bumps and the like without adversely affecting the controlled instroke and rebound damping of the landing gear mechanism during landing.

17 Claims, 3 Drawing Sheets

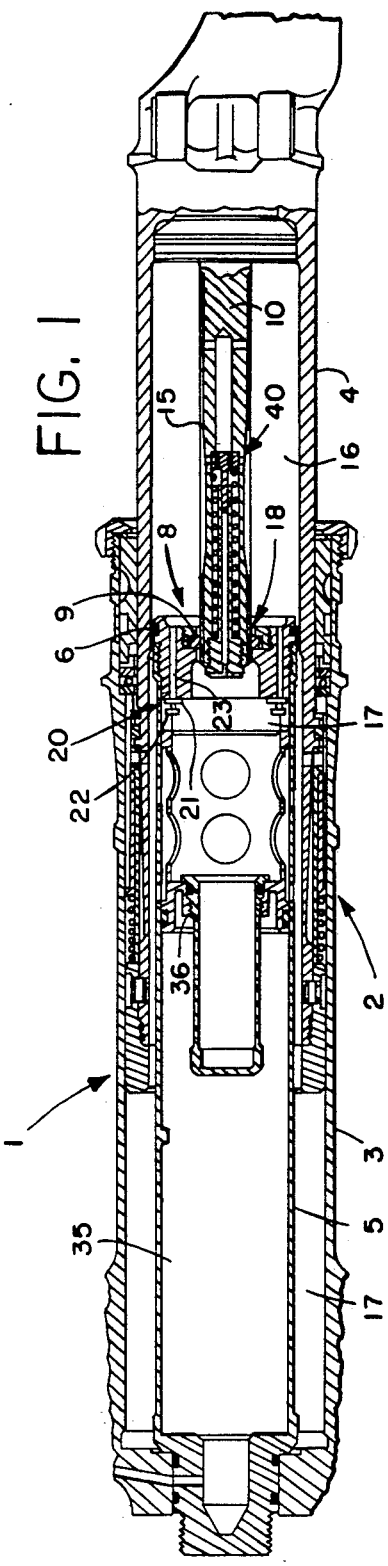
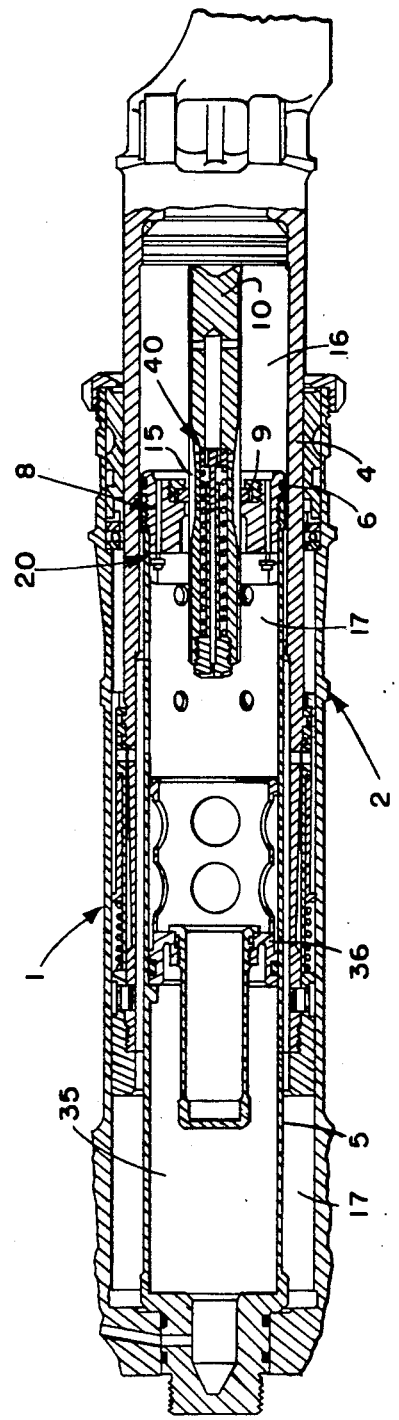

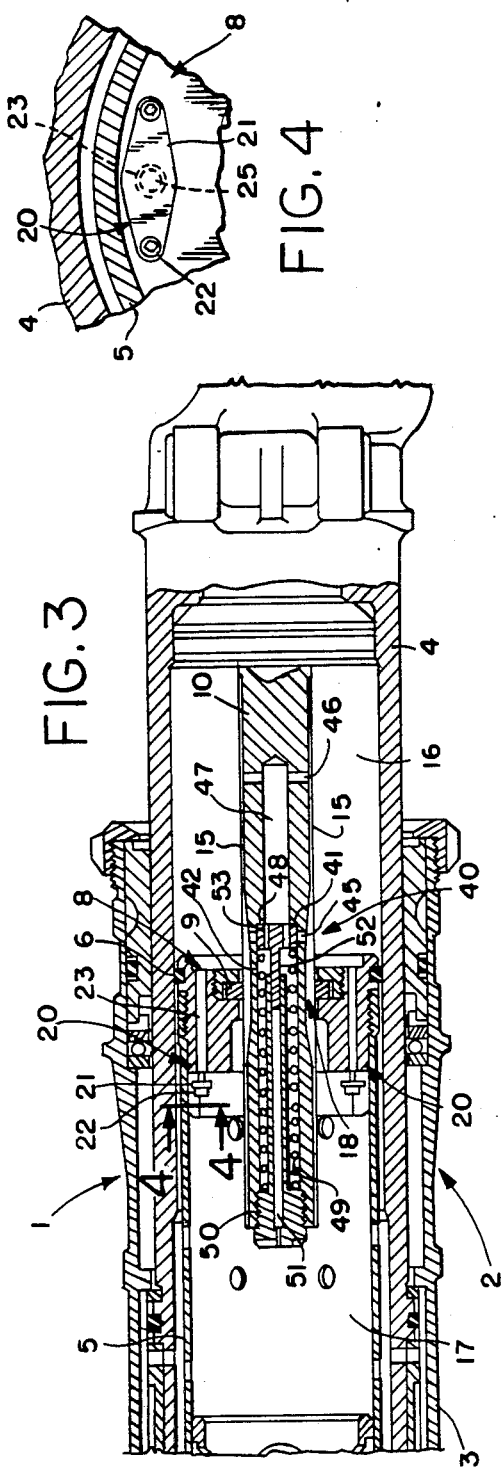
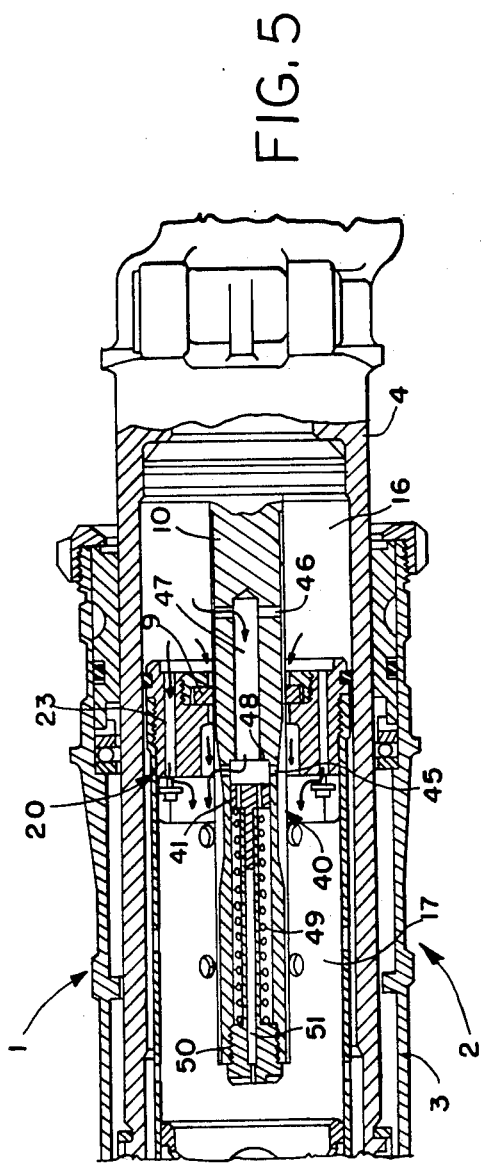

LANDING GEAR MECHANISM INCLUDING CONTROLLED INSTROKE AND REBOUND DAMPING AND STROKE OVERLOAD PROTECTION

BACKGROUND OF THE INVENTION

This invention relates generally as indicated to a landing gear mechanism including controlled instroke and rebound damping during landing on rough runways. Such a landing gear mechanism is especially designed to accommodate rebound damping associated with high performance short take-off and landing (S.T.O.L.) type aircraft such as operated by the military, but is also applicable to other types of high performance aircraft as well. Also, such landing gear mechanism desirably includes stroke overload protection to accommodate the deep stroke requirements of severe bumps during landing.

It is already generally known from U.S. Pat. No. 4,552,324, assigned to the same assignee as the present application, to provide a landing gear mechanism with a taxi instroke bypass valve that opens as soon as the landing stroke is complete to substantially reduce or eliminate the high damping loads that might otherwise take place during taxiing on rough runways. However, there is a continuing need to provide a more simplified way of achieving such controlled instroke damping.

Also, there is a need to enhance the rebound damping of the landing gear mechanism used on S.T.O.L. type aircraft. Because of the higher sink landing speeds (e.g., velocity toward the ground during landing) and different lift characteristics of S.T.O.L. type aircraft during landing, there is a greater tendency for S.T.O.L. type aircraft to rebound (e.g., bounce back off the ground) during landing. This condition is made even worse if the aircraft has to operate on rough runways, made rough, for example, as a result of temporary repairs to bomb damaged areas and the like.

Furthermore, there is a need to provide a simple and effective way of accommodating the deep stroke requirements of the landing gear to attenuate severe bumps during landing on rough runways without adversely affecting the aforementioned controlled instroke and rebound damping during landing.

SUMMARY OF THE INVENTION

With the foregoing in mind, it is a principal object of this invention to provide a landing gear mechanism having a first metered orifice area for controlled instroking of the landing gear during landing and a second metered orifice area that is less than the first metered orifice area to obtain the desired rebound damping during landing.

Another object is to provide such a landing gear mechanism which accommodates the deep stroke requirements needed to attenuate severe bumps without adversely affecting the controlled instroke and rebound damping of the landing gear mechanism during landing.

In accordance with one aspect of the invention, the landing gear mechanism includes one or more check valve assemblies that operate in conjunction with a variable area orifice metering pin to provide the desired controlled instroke of the gear during landing. The metering pin is shaped to provide a metered orifice area for restricted flow during both gear instroke and gear extension that varies depending on the position of the pin. The check valve assemblies provide for supplemental restricted flow during gear instroke, but allow little or no return flow during gear extension. Accordingly, a less metered orifice area, substantially only provided by the metering pin, is available during gear outstroke than during gear instroke, which may be effectively utilized to produce the desired rebound damping for S.T.O.L. as well as other type aircraft.

In accordance with another aspect of the invention, the landing gear mechanism may be provided with a relief valve to accommodate the deep stroke requirements necessary to attenuate severe bumps without adversely affecting the controlled instroke and rebound damping of the landing gear mechanism during landing.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a fragmentary longitudinal section through a preferred form of landing gear mechanism in accordance with this invention shown fully extended;

FIG. 2 is a fragmentary longitudinal section through such landing gear mechanism, similar to FIG. 1, but showing the landing gear mechanism partially retracted during the instroke of the landing gear mechanism during landing;

FIG. 3 is an enlarged fragmentary longitudinal section of the landing gear mechanism of FIG. 2;

FIG. 4 is a still further enlarged fragmentary transverse section through the landing gear mechanism of FIG. 3 taken generally along the plane of the line 4—4 thereof;

FIG. 5 is an enlarged fragmentary longitudinal section through the landing gear mechanism, similar to FIG. 3, but showing the landing gear mechanism in an intermediate position during the instroke in which a relief valve provides for the bypass flow of hydraulic fluid from the lower piston chamber to the upper piston chamber to attenuate severe bumps without adversely affecting the controlled instroke and rebound damping of the landing gear mechanism during landing;

DETAILED DESCRIPTION OF THE PREFERRED EMBODIMENTS

Figure 6:
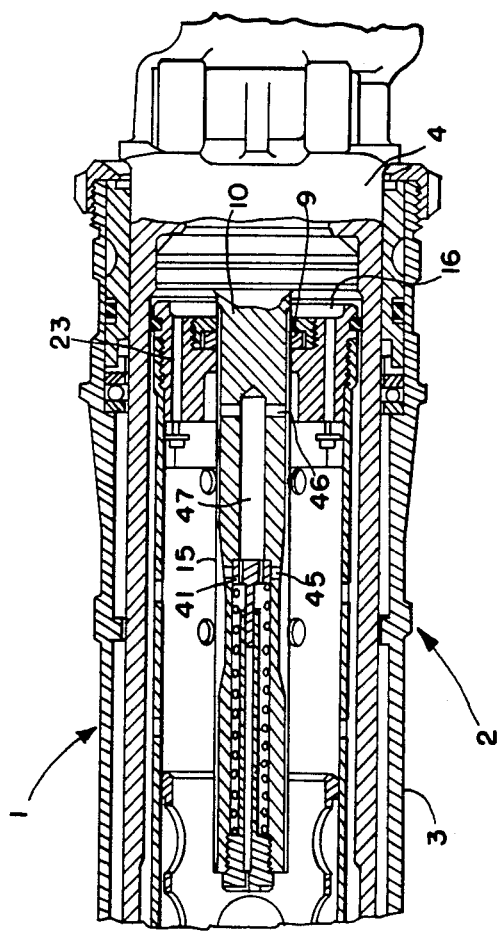
FIG. 6 is an enlarged fragmentary longitudinal section also similar to FIG. 3 but showing the landing gear mechanism moving through the last portion of the instroke during landing.

Referring now in detail to the drawings, and initially to FIG. 1, there is shown a preferred form of landing gear mechanism 1 in accordance with this invention which generally consists of a main shock strut 2 including an outer main cylinder 3 adapted to be connected at its upper or inboard end to the aircraft fuselage in conventional manner. Axially movable within the outer main cylinder is a main strut piston 4 which extends outwardly beyond the lower or outer end of the main cylinder for mounting of a wheel and tire assembly (not shown) to the outboard end thereof. The main piston 4 is generally tubular over its retracted length, to provide for relative sliding movement of an orifice support tube 5 therein. The orifice support tube is connected to the inboard end of the outer main cylinder 3 and extends coaxially therewithin into the main piston. Surrounding the outer end of the orifice support tube 5 is a ring seal 6 in sliding sealed engagement with the inner diameter (I.D.) of the main piston to prevent fluid flow therebetween.

Attached to the outboard end of the orifice support tube 5 is a restrictor orifice assembly 8 containing a floating orifice ring 9. Extending through the orifice ring 9 is a metering pin 10 which is connected to the main piston 4 for movement therewith. The metering pin 10 includes a plurality of longitudinally extending, circumferentially spaced flutes or slots 15 in the exterior thereof to provide the primary control of hydraulic damping as the fluid flows between lower and upper piston chambers 16, 17 on opposite sides of the orifice ring 9 as the landing gear strokes. As shown, for example, in FIG. 3, the depths of the slots 15 desirably vary along the length of the pin, to provide different flow orifice areas as the pin passes through the orifice ring 9 to control the dynamic load stroke curve of the landing gear within certain limits at different strut-stroke positions, as well known in the art.

To accommodate the structural envelope of the landing gear mechanism associated with the higher sink speed landings of S.T.O.L. type aircraft, the metering pin 10 stroke versus flow area may be selected so that the main shock strut vertical load will be reduced during the anticipated tire spring-back, thus assuring that the resulting combined loads keep the landing gear structure intact. Also, the metering pin 10 may be configured so that the maximum metered orifice area 18 provided for example by the slots 15 at the orifice ring 9 will occur at a point in the stroke corresponding to the normal taxiing position to eliminate the high damping loads that might otherwise occur during taxiing on rough runways without the need for a special bypass valve mechanism for that purpose.

The metered orifice area 18 provided by the metering pin 10 will of course allow a restricted flow between the lower and upper chambers 16, 17 during both gear extension (outstroking) and retraction (instroking). However, if the metering pin orifice area 18 is selected to control rebound damping in accordance with the present invention, such metering pin orifice area will not be adequate to provide the desired rate of instroke of the landing gear mechanism during landing. Accordingly, to increase such restricted flow during the gear instroke, one or more one-way check valve assemblies 20 are desirably provided in the restrictor orifice assembly 8 radially outwardly spaced from the orifice ring 9.

In the preferred embodiment of the invention disclosed in FIGS. 1-6, two such check valve assemblies 20 are provided, each including a flapper valve plate 21 connected to the inner end of the restrictor orifice assembly 8 as by means of a pair of shoulder bolts 22 which permit limited movement of the valve plates 21 between open and closed positions respectively blocking and permitting fluid flow through associated flow passages 23 in the restrictor orifice assembly. As will be apparent, such check valve plates 21 allow additional restricted flow from the lower piston chamber 16 to the upper piston chamber 17 during gear instroke to supplement the restricted flow through the metered pin orifice area 18. However, during the gear outstroke, the return flow from the upper piston chamber to the lower piston chamber produces a suction that causes the check valve assemblies 20 to close, permitting little or no return flow through the check valve assemblies. Alternatively, one or more small holes 25 may be provided in one or both valve plates 21 as shown in phantom lines in FIG. 4 to permit some limited return flow through the check valve assemblies 20 during the gear outstroke which is substantially less than the flow therethrough during the gear instroke.

Figure 7:
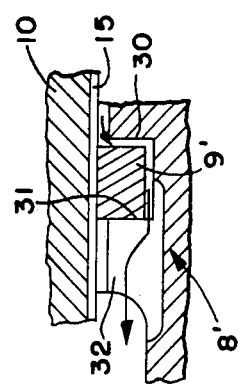
FIG. 7 is an enlarged fragmentary longitudinal section through a portion of an alternate form of landing gear mechanism in accordance with this invention.

Also, if desired, a floating orifice ring 9' such as shown in FIG. 7 may itself act as a check valve to supplement or replace the additional restricted flow through the check valve assemblies 20 during the gear instroke. For that purpose, a modified form of restrictor orifice assembly 8' of the type shown in FIG. 7 may be provided, including a sealing flange 30 adjacent the side of the orifice ring facing the lower piston chamber and a non-sealing flange 31 adjacent the side of the orifice ring facing the upper piston chamber. During the gear instroke, the fluid passing from the lower piston chamber to the upper piston chamber will cause the orifice ring 9' to move upwardly into engagement with the non-sealing flange 31 as illustrated in FIG. 7, thus permitting additional restricted flow around the outer diameter (O.D.) of the orifice ring 9' and through axial slots 32 in the nonsealing flange 31. Conversely, during the gear outstroke, the fluid passing from the upper piston chamber to the lower piston chamber will cause a suction that forces the orifice ring 9' up against the sealing flange 30 to allow little or no return flow around the exterior of the orifice ring.

In either case, less total metered orifice flow area is available during the gear outstroke than during the gear instroke. This greatly enhances rebound damping, since the capability of the air charge in the upper end 35 of the orifice support tube 5 to extend the gear is much more restricted than if the total metered orifice area were available in both directions as is the usual case. Such air charge in the orifice support tube 5 acts on the hydraulic fluid in the upper piston chamber 17 through a secondary piston 36 which is axially movable within the orifice support tube between the two end positions shown in FIGS. 1 and 2, respectively.

In addition to, or in lieu of the increased flow area provided by the variable depth slots 15 in the metering pin 10 to accommodate runway roughness during taxiing, a relief valve assembly 40 is desirably provided in the metering pin to accommodate the deep stroke requirements of severe bumps which need more orifice bypass than that provided by the metering pin itself during the landing stroke. At the same time, it is desirable to make the relief valve assembly 40 ineffective during both the initial portion of the instroke of the landing gear mechanism and the last portion of the instroke during landing, since the optimum overall load stroke landing curve is best achieved utilizing only the metering pin 10 control and check valve assemblies formed either by the check valve assemblies 20 or floating orifice ring 9'. To that end, the relief valve assembly 40 desirably includes a valve poppet 41 axially movable within a counterbore 42 in the metering pin 10 for controlling the flow of hydraulic fluid between two sets of longitudinally spaced flow holes 45, 46 in the pin sides which define the range of operation of the relief valve assembly relative to the strut stroke as described hereafter. A central passage 47 in the metering pin 10 provides fluid communication between the two sets of flow holes 45, 46 except when the valve poppet 41 is in seated engagement with a valve seat 48 blocking fluid flow through the passage 47.

The valve poppet 41 is biased into engagement with the valve seat 48 as by means of a valve spring 49 retained within the metering pin by a spring retainer 50 which may be threaded or otherwise fastened to the outer end of the counterbore 42. The spring retainer 50 has a central opening 51 therethrough which receives the valve stem 52 at the inner end thereof and is in fluid communication with the upper piston chamber 17 at the outer end thereof so that the valve stem senses the fluid pressure in the upper piston chamber. One or more longitudinal holes 53 may also be provided in the valve poppet 41 to prevent hydraulic fluid from being trapped behind the valve poppet.

The location of the flow holes 45, 46 in the metering pin 10 is such that the relief valve assembly 40 will allow hydraulic fluid to bypass the orifice ring 9, at a pre-set pressure drop, only after the landing gear mechanism 1 has completed the first portion of its instroke during landing and not during the very last portion of the landing stroke. As clearly shown in FIGS. 1 and 2 (and its FIG. 3 enlargement), as the landing gear strokes from its fully extended position (FIG. 1) through the first portion of the landing stroke to the position shown in FIGS. 2 and 3, both sets of flow holes 45, 46 remain below the orifice ring 9. Accordingly, even though the pressure in the lower piston chamber 16 acting on the valve poppet 41 may be sufficient to cause the valve poppet to open, the flow path through the valve poppet will be confined to the lower piston chamber.

However, as the gear instroke continues from the FIG. 3 position to the FIG. 5 position, the uppermost flow holes 45 will stroke past the orifice ring 9 to establish a potential flow path from the lower piston chamber 16 to the upper piston chamber 17 through the valve poppet as long as the lower flow holes 46 remain below the orifice ring. During this intermediate portion of the stroke of the landing gear mechanism, the relief valve assembly 40 will accommodate the deep stroke requirements of severe bumps which need more flow area than that provided by the metering pin 10 (and check valve assemblies 20 and/or floating orifice ring 9′) during the landing stroke. Also, the relief valve 40 setting and flow pressure drop will accommodate the high landing sink speeds which need most of the gear stroke.

As the gear instroke continues from the FIG. 5 position to the FIG. 6 position during landing, the lower flow holes 46 will cross over the orifice ring 9 from the lower piston chamber 16 to the upper piston chamber 17 so that both sets of flow holes 45, 46 will be above the orifice ring, thus once again eliminating the relief valve bypass flow path between the lower and upper piston chambers during the remaining portion of the instroke during landing.

From the foregoing, it will be apparent that the landing gear mechanism of the present invention provides a simple and effective way of controlling the instroke and rebound damping during landing, as well as a novel relief valve assembly for accommodating the deep stroke requirements needed to attenuate severe bumps without adversely affecting such controlled instroke and rebound damping. Also, the operating range of the relief valve assembly can readily be selected relative to the gear instroke so that the relief valve assembly is only operative in those desired areas of the gear instroke, thus eliminating the need for having to tune and compromise the landing gear design.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

We claim:

1. A landing gear mechanism comprising a main cylinder, a main strut piston axially movable within said main cylinder, restrictor means contained within said cylinder and defining with said cylinder and piston upper and lower chambers, said restrictor means including orifice means providing for the passage of fluid between said upper and lower chambers during relative movement between said piston and cylinder, said orifice means comprising an opening through said restrictor means, and a metering pin attached to said piston for movement therewith, said metering pin extending through said opening in said restrictor means, and relief valve means contained within said metering pin for movement therewith, said relief valve means including means providing for the bypass flow of fluid from said lower chamber to said upper chamber via said relief valve means in response to a pre-set pressure drop from said lower chamber to said upper chamber only during an intermediate portion of the instroke of said landing gear mechanism, and means for blocking bypass flow of fluid from said upper chamber to said lower chamber via said relief valve means during the entire outstroke of said landing gear mechanism.

2. The landing gear mechanism of claim 1 wherein said relief valve means includes means for blocking the bypass flow of fluid from said lower chamber to said upper chamber via said relief valve means during both the initial portion of the instroke of said landing gear mechanism and during the last portion of the instroke of said landing gear mechanism during landing irrespective of the pressure drop from said lower chamber to said upper chamber.

3. The landing gear mechanism of claim 1 wherein said relief valve means comprises longitudinally spaced flow holes through the sides of said metering pin communicating with each other through passage means in said metering pin, the relative spacing between said longitudinally spaced flow holes being such that said longitudinally spaced flow holes are located on opposite sides of said restrictor means only when said landing gear mechanism is in such intermediate portion of the movement of said landing gear mechanism, and valve poppet means provide for the bypass flow through said passage means only when said longitudinally spaced apart flow holes are on opposite sides of said restrictor means and such pre-set pressure drop has occurred from said lower chamber to said upper chamber and only during the intermediate portion of the instroke of said landing gear mechanism.

4. The landing gear mechanism of claim 3 further comprising a valve seat in said passage means intermediate said longitudinally spaced flow holes, and spring means for biasing said valve poppet means into engagement with said valve seat for blocking fluid flow through said passage means between said longitudinally spaced flow holes.

5. The landing gear mechanism of claim 3 wherein said valve poppet means has a first surface area exposed to the fluid in said lower chamber, and a second opposed surface area less than said first surface area exposed to the fluid in said upper chamber.

6. The landing gear mechanism of claim 3 wherein the spacing between said longitudinally spaced flow holes is such that all of said flow holes communicate with said lower chamber during the initial portion of the instroke of said landing gear mechanism during landing, whereby said relief valve means is ineffective in permitting bypass flow from said lower chamber to said upper chamber during such initial portion of the instroke of said landing gear mechanism during landing.

7. The landing gear mechanism of claim 3 wherein the spacing between said longitudinally spaced flow holes is such that all of said flow holes communicate with said upper chamber during the last portion of the instroke of said landing gear mechanism during landing, whereby said relief valve means is ineffective in permitting bypass flow from said lower chamber to said upper chamber during such last portion of the instroke of said landing gear mechanism during landing.

8. The landing gear mechanism of claim 1 wherein said metering pin defines a variable area orifice with said opening in said restrictor means for controlling the rate of fluid flow from said upper chamber to said lower chamber to obtain the desired rebound damping of said landing gear mechanism during landing, the exterior of said metering pin having a plurality of axially extending slots of substantially the same axial length, the dimensions of said slots varying along the length of said metering pin to provide different flow orifice areas through said slots at different stroke positions of said landing gear mechanism.

9. The landing gear mechanism of claim 8 wherein the maximum metered orifice area provided by said slots in said metering pin occurs at a point in the stroke of said landing gear mechanism at the intermediate portion of the movement of said landing gear mechanism corresponding to the normal taxiing position of said landing gear mechanism.

10. The landing gear mechanism of claim 9 wherein the maximum metered orifice area provided by said slots in said metering pin is sufficient to eliminate the high damping loads that might otherwise occur during taxiing on rough runways.

11. The landing gear mechanism of claim 8 further comprising check valve means providing for the flow of additional fluid from said lower chamber to said upper chamber during the instroke of said landing gear mechanism during landing, said check valve means comprising a flapper valve plate mounted for limited movement between an open position permitting additional restricted flow from said lower chamber to said upper chamber through a flow passage in said restrictor means to supplement the restricted flow through said variable area orifice during the instroke of said landing gear mechanism, and a closed position substantially blocking the flow through said flow passage from said upper chamber to said lower chamber during the outstroke of said landing gear mechanism.

12. The landing gear mechanism of claim 11 further comprising restricted orifice means through said flapper valve plate to permit restricted flow from said upper chamber to said lower chamber through said flow passage during the outstroke of said landing gear mechanism which is substantially less than the flow through said flow passage from said lower chamber to said upper chamber during the instroke of said landing gear mechanism.

13. The landing gear mechanism of claim 11 wherein there are a plurality of said check valve means in said restrictor means to supplement the flow of fluid from said lower chamber to said upper chamber during the instroke of said landing gear mechanism during landing.

14. The landing gear mechanism of claim 8 further comprising an orifice ring in said opening in said restrictor means, said metering pin extending through said orifice ring and defining therewith said variable area orifice.

15. The landing gear mechanism of claim 14 further comprising check valve means providing for the flow of additional fluid from said lower chamber to said upper chamber during the instroke of said landing gear mechanism during landing, said check valve means including said orifice ring which is axially movable between a first position permitting restricted flow of fluid around the exterior of said orifice ring from said lower chamber to said upper chamber during the instroke of said landing gear mechanism, and a second position substantially blocking such fluid flow around the exterior of said orifice ring from said upper chamber to said lower chamber during the outstroke of said landing gear mechanism.

16. The landing gear mechanism of claim 15 wherein said restrictor means has a non-sealing flange engageable by said orifice ring during the instroke of said landing gear mechanism to permit such restricted flow of fluid around the exterior of said orifice ring, and a sealing flange axially spaced from said non-sealing flange engageable by said orifice ring during the outstroke of said landing gear mechanism to substantially block the flow of fluid from said upper chamber to said lower chamber around the exterior of said orifice ring.

17. The landing gear mechanism of claim 16 wherein said non-sealing flange has a plurality of axial slots extending therethrough which communicate with a clearance space surrounding said orifice ring.

* * * * *